United States Patent [19]
Asgari

[11] Patent Number: 5,485,461
[45] Date of Patent: Jan. 16, 1996

[54] ATM CELL DETECTOR

[75] Inventor: Hamidreza Asgari, Rotterdam, Netherlands

[73] Assignee: Koninklijke PTT Nederland N.V., Groningen, Netherlands

[21] Appl. No.: 264,317

[22] Filed: Jun. 23, 1994

[30] Foreign Application Priority Data

Jul. 1, 1993 [NL] Netherlands .................. 9301156

[51] Int. Cl.$^6$ ...................................... H04J 3/24
[52] U.S. Cl. .................. 370/94.2; 371/37.1; 370/60; 370/94.1
[58] Field of Search ............... 370/94.2, 100.1, 370/101, 105.4, 13, 13.1, 94.1, 60; 371/37.1, 37.4, 38.1, 44

[56] References Cited

U.S. PATENT DOCUMENTS

| | | | |
|---|---|---|---|
| 4,569,050 | 2/1986 | Ohme | 371/37.1 |
| 5,014,276 | 5/1991 | Bush et al. | 371/37.4 |
| 5,224,091 | 6/1993 | Brandt | 370/13 |
| 5,289,476 | 2/1994 | Johnson et al. | 371/37.1 |

FOREIGN PATENT DOCUMENTS 2172176 3/1985 United Kingdom.

OTHER PUBLICATIONS

Electronics Letters; "New Retiming and Synchronization Scheme for Optical ATM Switching Systems"; Jan. 18, 1990; vol. 26, No. 2; pp. 99–100.

Richard C. Walker et al.; "A Chipset for Gigabit Rate Data Communication"; Sep. 18, 1989; Proceedings of the 1989 Bipolar Circuits and Technology Meeting; (IEEE); pp. 288–290.

Primary Examiner—Douglas W. Olms
Assistant Examiner—Shick Hom
Attorney, Agent, or Firm—Frishauf, Holtz, Goodman, Langer & Chick

[57] ABSTRACT

Method for detecting data packets, such as ATM data cells. The preamble comprises a bit alignment word (AW) and a unique word (UW). Successively, the Hamming distances, hd's, are calculated from the first detected 1-bit, over a length of AW plus UW, then from the next bit over a length of UW, and finally from the second 1-bit, again over a length of AW plus UW. The position of the first bit of the detected data packet is then calculated on the basis of the hd values thus calculated.

2 Claims, 15 Drawing Sheets

FIG. 3

| Bitstream | | Bitstring B(d1) | bd(1) from B(d1)<>B(aw+uw) | State |
|---|---|---|---|---|
| (GAP) | (AW) | (UW) | | |
| 00000000 | 1100 | 10101 | 1100 10101 | 0 | In-Synchronization |
| 00000000 | 1100 | 10100 | 1100 10100 | 1 | In-Synchronization |
| 00000000 | 1100 | 10111 | 1100 10111 | 1 | In-Synchronization |
| 00000000 | 1100 | 10001 | 1100 10001 | 1 | In-Synchronization |
| 00000000 | 1100 | 11101 | 1100 11101 | 1 | In-Synchronization |
| 00000000 | 1100 | 00101 | 1100 00101 | 1 | In-Synchronization |
| 00000000 | 1101 | 10101 | 1101 10101 | 1 | In-Synchronization |
| 00000000 | 1110 | 10101 | 1110 10101 | 1 | In-Synchronization |
| 00000000 | 1000 | 10101 | 1000 10101 | 1 | In-Synchronization |
| 00000001 | 0100 | 10101 | 1001 0101D | ≥6 | Out-Synchronization |
| 00000001 | 1100 | 10101 | 1110 01010 | 6 | Out-Synchronization |
| 00000010 | 1100 | 10101 | 1011 00101 | 4 | Out-Synchronization |
| 00000100 | 1100 | 10101 | 1001 10010 | 5 | Out-Synchronization |
| 00001000 | 1100 | 10101 | 1000 11001 | 3 | Out-Synchronization |
| 00010000 | 1100 | 10101 | 1000 01100 | 4 | Out-Synchronization |
| 00100000 | 1100 | 10101 | 1000 00110 | 4 | Out-Synchronization |
| 01000000 | 1100 | 10101 | 1000 00011 | 4 | Out-Synchronization |
| 10000000 | 1100 | 10101 | 1000 00001 | 3 | Out-Synchronization |

D=don't care

FIG. 4

| Bitstream (GAP) | Bitstream (AW) | (UW) | Bitstring B(d2) | hd(2) from B(d2)<>B(uw) | State |
|---|---|---|---|---|---|
| 00000000 | 1100 | 10101 | 01010 | 5 | Out-Synchronization |
| 00000000 | 1100 | 10100 | 01101 | 5 | Out-Synchronization |
| 00000000 | 1100 | 10111 | 01011 | 4 | Out-Synchronization |
| 00000000 | 1100 | 10001 | 01000 | 4 | Out-Synchronization |
| 00000000 | 1100 | 11101 | 01110 | 4 | Out-Synchronization |
| 00000000 | 1100 | 00101 | 00010 | 4 | Out-Synchronization |
| 00000001 | 1101 | 10101 | 11010 | 4 | Out-Synchronization |
| 00000000 | 1110 | 10101 | 01010 | 5 | Out-Synchronization |
| 00000000 | 1000 | 10101 | 01010 | 5 | Out-Synchronization |
| 00000000 | 0100 | 10101 | 10101 | 0 | In-Synchronization |
| 00000001 | 1100 | 10101 | 00101 | 1 | Out-Synchronization |
| 00000010 | 1100 | 10101 | 10010 | 3 | Out-Synchronization |
| 00000100 | 1100 | 10101 | 11001 | 2 | Out-Synchronization |
| 00001000 | 1100 | 10101 | 01100 | 3 | Out-Synchronization |
| 00010000 | 1100 | 10101 | 00110 | 3 | Out-Synchronization |
| 00100000 | 1100 | 10101 | 00011 | 3 | Out-Synchronization |
| 01000000 | 1100 | 10101 | 00001 | 2 | Out-Synchronization |
| 10000000 | 1100 | 10101 | 00000 | 3 | Out-Synchronization |

D=don't care

FIG. 5

| Bitstream (GAP) | (AW) | (UW) | Bitstring B(d3) | hd(3) from B(d3)<>B(aw+uw) | State |
|---|---|---|---|---|---|
| 00000000 | 1100 | 10101 | 1001 0101D | ≥6 | Out-Synchronization |
| 00000000 | 1100 | 1010<u>0</u> | 1001 0100D | ≥5 | Out-Synchronization |
| 00000000 | 1100 | 101<u>1</u>1 | 1001 0111D | ≥5 | Out-Synchronization |
| 00000000 | 1100 | 10<u>0</u>01 | 1001 0001D | ≥5 | Out-Synchronization |
| 00000000 | 1100 | 1<u>1</u>101 | 1001 1101D | ≥5 | Out-Synchronization |
| 00000000 | 1100 | <u>0</u>0101 | 1000 0101D | ≥5 | Out-Synchronization |
| 00000000 | 110<u>1</u> | 10101 | 1011 0101D | ≥7 | Out-Synchronization |
| 00000000 | 11<u>1</u>0 | 10101 | 1101 0101D | ≥6 | Out-Synchronization |
| 00000000 | 1<u>0</u>00 | 10101 | 1010 1DDDD | ≥2 | Out-Synchronization |
| 00000000 | <u>0</u>100 | 10101 | 1010 1DDDD | ≥2 | Out-Synchronization |
| 0000000<u>1</u> | 1100 | 10101 | 1100 10101 | 0 | In-Synchronization |
| 000000<u>1</u>0 | 1100 | 10101 | 1100 10101 | 0 | In-Synchronization |
| 00000<u>1</u>00 | 1100 | 10101 | 1100 10101 | 0 | In-Synchronization |
| 0000<u>1</u>000 | 1100 | 10101 | 1100 10101 | 0 | In-Synchronization |
| 000<u>1</u>0000 | 1100 | 10101 | 1100 10101 | 0 | In-Synchronization |
| 00<u>1</u>00000 | 1100 | 10101 | 1100 10101 | 0 | In-Synchronization |
| 0<u>1</u>000000 | 1100 | 10101 | 1100 10101 | 0 | In-Synchronization |
| <u>1</u>0000000 | 1100 | 10101 | 1100 10101 | 0 | In-Synchronization |

D=don't care

FIG. 6

| Bitstream (GAP) | (AW) | (UW) | Bitstring B(d1) | hd(1) from B(d1)<>B(aw+uw) | State |
|---|---|---|---|---|---|
| 00000000 | 1100 | 0101 | 1100 0101 | 0 | In-Synchronization |
| 00000000 | 1100 | 010<u>0</u> | 1100 0100 | 1 | In-Synchronization |
| 00000000 | 1100 | 011<u>1</u> | 1100 0111 | 1 | In-Synchronization |
| 00000000 | 1100 | 0<u>0</u>01 | 1100 0001 | 1 | In-Synchronization |
| 00000000 | 1100 | <u>1</u>101 | 1100 1101 | 1 | In-Synchronization |
| 00000000 | 110<u>1</u> | 0101 | 1101 0101 | 1 | In-Synchronization |
| 00000000 | 111<u>0</u> | 0101 | 1110 0101 | 1 | In-Synchronization |
| 00000000 | <u>1</u>000 | 0101 | 1000 0101 | 1 | In-Synchronization |
| 00000000 | <u>0</u>100 | 0101 | 1000 101D | ≥4 | Out-Synchronization |
| 0000000<u>1</u> | 1100 | 0101 | 1110 0010 | 4 | Out-Synchronization |
| 000000<u>1</u>0 | 1100 | 0101 | 1011 0001 | 4 | Out-Synchronization |
| 00000<u>1</u>00 | 1100 | 0101 | 1001 1000 | 5 | Out-Synchronization |
| 0000<u>1</u>000 | 1100 | 0101 | 1000 1100 | 3 | Out-Synchronization |
| 000<u>1</u>0000 | 1100 | 0101 | 1000 0110 | 3 | Out-Synchronization |
| 00<u>1</u>00000 | 1100 | 0101 | 1000 0011 | 3 | Out-Synchronization |
| 0<u>1</u>000000 | 1100 | 0101 | 1000 0001 | 2 | Out-Synchronization |
| <u>1</u>0000000 | 1100 | 0101 | 1000 0000 | 3 | Out-Synchronization |

D=don't care

FIG. 7

| Bitstream | | Bitstring B(d2) | hd(2) from B(d2)<>B(uw) | State |
|---|---|---|---|---|
| (GAP) | (UW) | | | |
| 00000000 | 1100 0101 | 0010 | 3 | Out-Synchronization |
| 00000000 | 1100 0100 | 0010 | 3 | Out-Synchronization |
| 00000000 | 1100 0111 | 0011 | 2 | Out-Synchronization |
| 00000000 | 1100 0001 | 0000 | 2 | Out-Synchronization |
| 00000000 | 1100 1101 | 0110 | 2 | Out-Synchronization |
| 00000000 | 1101 0101 | 1010 | 4 | Out-Synchronization |
| 00000000 | 1110 0101 | 0010 | 3 | Out-Synchronization |
| 00000000 | 1000 0101 | 0010 | 3 | Out-Synchronization |
| 00000000 | 0100 0101 | 0101 | 0 | In-Synchronization |
| 00000001 | 1100 0101 | 0001 | 1 | Out-Synchronization |
| 00000010 | 1100 0101 | 1000 | 3 | Out-Synchronization |
| 00000100 | 1100 0101 | 1100 | 2 | Out-Synchronization |
| 00001000 | 1100 0101 | 0110 | 2 | Out-Synchronization |
| 00010000 | 1100 0101 | 0011 | 2 | Out-Synchronization |
| 00100000 | 1100 0101 | 0001 | 1 | Out-Synchronization |
| 01000000 | 1100 0101 | 0000 | 2 | Out-Synchronization |
| 10000000 | 1100 0101 | 0000 | 2 | Out-Synchronization |

D=don't care

FIG. 8

| Bitstream | | Bitstring B(d3) | hd(3) from B(d3)<>B(aw+uw) | State |
|---|---|---|---|---|
| (GAP) | (AW) | (UW) | | |
| 00000000 | 1100 | 0101 | 1000 101D | ≥4 | Out-Synchronization |
| 00000000 | 1100 | 0100 | 1000 100D | ≥3 | Out-Synchronization |
| 00000000 | 1100 | 0111 | 1000 111D | ≥3 | Out-Synchronization |
| 00000000 | 1100 | 0001 | 1000 001D | ≥3 | Out-Synchronization |
| 00000000 | 1100 | 1101 | 1001 101D | ≥5 | Out-Synchronization |
| 00000000 | 1101 | 0101 | 1010 101D | ≥5 | Out-Synchronization |
| 00000000 | 1110 | 0101 | 1100 101D | ≥3 | Out-Synchronization |
| 00000000 | 1000 | 0101 | 101D DDDD | ≥2 | Out-Synchronization |
| 00000000 | 0100 | 0101 | 101D DDDD | ≥2 | Out-Synchronization |
| 00000001 | 1100 | 0101 | 1100 0101 | 0 | In-Synchronization |
| 00000010 | 1100 | 0101 | 1100 0101 | 0 | In-Synchronization |
| 00000100 | 1100 | 0101 | 1100 0101 | 0 | In-Synchronization |
| 00001000 | 1100 | 0101 | 1100 0101 | 0 | In-Synchronization |
| 00010000 | 1100 | 0101 | 1100 0101 | 0 | In-Synchronization |
| 00100000 | 1100 | 0101 | 1100 0101 | 0 | In-Synchronization |
| 01000000 | 1100 | 0101 | 1100 0101 | 0 | In-Synchronization |
| 10000000 | 1100 | 0101 | 1100 0101 | 0 | In-Synchronization |

D=don't care

FIG. 9

| (GAP) | Bitstream (AW) | (UW) | Bitstring B(d1) | hd(1) from B(d1)<>B(aw+uw) | State |
|---|---|---|---|---|---|
| 00000000 | 1100 | 010 | 1100 010 | 0 | In-Synchronization |
| 00000000 | 1100 | 01<u>1</u> | 1100 011 | 1 | In-Synchronization |
| 00000000 | 1100 | 0<u>0</u>0 | 1100 000 | 1 | In-Synchronization |
| 00000000 | 1100 | <u>1</u>10 | 1100 110 | 1 | In-Synchronization |
| 00000000 | 110<u>1</u> | 010 | 1101 010 | 1 | In-Synchronization |
| 00000000 | 11<u>1</u>0 | 010 | 1110 010 | 1 | In-Synchronization |
| 00000000 | 1<u>0</u>00 | 010 | 1000 010 | 1 | In-Synchronization |
| 00000000 | <u>0</u>100 | 010 | 1000 10D | ≥3 | Out-Synchronization |
| 0000000<u>1</u> | 1100 | 010 | 1110 001 | 3 | Out-Synchronization |
| 000000<u>1</u>0 | 1100 | 010 | 1011 000 | 4 | Out-Synchronization |
| 00000<u>1</u>00 | 1100 | 010 | 1001 100 | 4 | Out-Synchronization |
| 0000<u>1</u>000 | 1100 | 010 | 1000 110 | 2 | Out-Synchronization |
| 000<u>1</u>0000 | 1100 | 010 | 1000 011 | 2 | Out-Synchronization |
| 00<u>1</u>00000 | 1100 | 010 | 1000 001 | 3 | Out-Synchronization |
| 0<u>1</u>000000 | 1100 | 010 | 1000 000 | 2 | Out-Synchronization |
| <u>1</u>0000000 | 1100 | 010 | 1000 000 | 2 | Out-Synchronization |

D=don't care

FIG. 10

| Bitstream | | Bitstring B(d2) | hd(2) from B(d2)<>B(uw) | State |
|---|---|---|---|---|
| (GAP) | (AW) | (UW) | | | |
| 00000000 | 1100 | 010 | 001 | 2 | Out-Synchronization |
| 00000000 | 1100 | 01<u>1</u> | 001 | 2 | Out-Synchronization |
| 00000000 | 1100 | 0<u>0</u>0 | 000 | 1 | Out-Synchronization |
| 00000000 | 1100 | <u>1</u>10 | 011 | 1 | Out-Synchronization |
| 00000000 | 110<u>1</u> | 010 | 101 | 3 | Out-Synchronization |
| 00000000 | 11<u>1</u>0 | 010 | 001 | 2 | Out-Synchronization |
| 00000000 | 1<u>0</u>00 | 010 | 001 | 2 | Out-Synchronization |
| 00000000 | <u>0</u>100 | 010 | 010 | 0 | In-Synchronization |
| 0000000<u>1</u> | 1100 | 010 | 000 | 1 | Out-Synchronization |
| 000000<u>1</u>0 | 1100 | 010 | 100 | 2 | Out-Synchronization |
| 00000<u>1</u>00 | 1100 | 010 | 110 | 1 | Out-Synchronization |
| 0000<u>1</u>000 | 1100 | 010 | 011 | 1 | Out-Synchronization |
| 000<u>1</u>0000 | 1100 | 010 | 001 | 2 | Out-Synchronization |
| 00<u>1</u>00000 | 1100 | 010 | 000 | 1 | Out-Synchronization |
| 0<u>1</u>000000 | 1100 | 010 | 000 | 1 | Out-Synchronization |
| <u>1</u>0000000 | 1100 | 010 | 000 | 1 | Out-Synchronization |

D=don't care

FIG. 11

| Bitstream (GAP) | (AW) | (UW) | Bitstring B(d3) | hd(3) from B(d3)<>B(aw+uw) | State |
|---|---|---|---|---|---|
| 00000000 | 1100 | 010 | 1000 10D | ≥3 | Out-Synchronization |
| 00000000 | 1100 | 011 | 1000 11D | ≥2 | Out-Synchronization |
| 00000000 | 1100 | 000 | 1000 00D | ≥2 | Out-Synchronization |
| 00000000 | 1100 | 110 | 1001 10D | ≥4 | Out-Synchronization |
| 00000000 | 1101 | 010 | 1010 10D | ≥4 | Out-Synchronization |
| 00000000 | 1110 | 010 | 1100 10D | ≥2 | Out-Synchronization |
| 00000000 | 1000 | 010 | 10DD DDD | ≥1 | Out-Synchronization |
| 00000000 | 0100 | 010 | 10DD DDD | ≥1 | Out-Synchronization |
| 00000001 | 1100 | 010 | 1100 010 | 0 | In-Synchronization |
| 00000010 | 1100 | 010 | 1100 010 | 0 | In-Synchronization |
| 00000100 | 1100 | 010 | 1100 010 | 0 | In-Synchronization |
| 00001000 | 1100 | 010 | 1100 010 | 0 | In-Synchronization |
| 00010000 | 1100 | 010 | 1100 010 | 0 | In-Synchronization |
| 00100000 | 1100 | 010 | 1100 010 | 0 | In-Synchronization |
| 01000000 | 1100 | 010 | 1100 010 | 0 | In-Synchronization |
| 10000000 | 1100 | 010 | 1100 010 | 0 | In-Synchronization |

D=don't care

FIG. 12

| Bitstream | | | Bitstring B(d1) | bd(1) from B(d1)<>B(aw+uw) | State |
|---|---|---|---|---|---|
| (GAP) | (AW) | (UW) | | | |
| 000000 | 11 | 010 | 11 010 | 0 | In-Synchronization |
| 000000 | 11 | 01<u>1</u> | 11 011 | 1 | In-Synchronization |
| 000000 | 11 | 0<u>0</u>0 | 11 000 | 1 | In-Synchronization |
| 000000 | 11 | <u>1</u>10 | 11 110 | 1 | In-Synchronization |
| 000000 | 1<u>0</u> | 010 | 10 010 | 1 | In-Synchronization |
| 00000<u>1</u> | <u>0</u>1 | 010 | 10 10D | ≥3 | Out-Synchronization |
| 000001 | 11 | 010 | 11 101 | 3 | Out-Synchronization |
| 0000<u>1</u>0 | 11 | 010 | 10 110 | 2 | Out-Synchronization |
| 000<u>1</u>00 | 11 | 010 | 10 011 | 2 | Out-Synchronization |
| 00<u>1</u>000 | 11 | 010 | 10 001 | 3 | Out-Synchronization |
| 0<u>1</u>0000 | 11 | 010 | 10 000 | 2 | Out-Synchronization |
| <u>1</u>00000 | 11 | 010 | 10 000 | 2 | Out-Synchronization |

D=don't care

FIG. 13

| Bitstream | | Bitstring B(d2) | hd(2) from B(d2)<>B(uw) | State |
|---|---|---|---|---|
| (GAP) | (AW) | (UW) | | | |
| 000000 | 11 | 010 | 101 | 3 | Out-Synchronization |
| 000000 | 11 | 011 | 101 | 3 | Out-Synchronization |
| 000000 | 11 | 000 | 100 | 2 | Out-Synchronization |
| 000000 | 11 | 110 | 111 | 2 | Out-Synchronization |
| 000000 | 10 | 010 | 001 | 2 | Out-Synchronization |
| 000000 | 01 | 010 | 010 | 0 | In-Synchronization |
| 000001 | 11 | 010 | 110 | 1 | Out-Synchronization |
| 000010 | 11 | 010 | 011 | 1 | Out-Synchronization |
| 000100 | 11 | 010 | 001 | 2 | Out-Synchronization |
| 001000 | 11 | 010 | 000 | 1 | Out-Synchronization |
| 010000 | 11 | 010 | 000 | 1 | Out-Synchronization |
| 100000 | 11 | 010 | 000 | 1 | Out-Synchronization |

FIG. 14

| Bitstream | | Bitstring B(d3) | hd(3) from B(d3)<>B(aw+uw) | State |
|---|---|---|---|---|
| (GAP) | (AW) (UW) | | | |
| 000000 | 11 010 | 10 10D | ≥3 | Out-Synchronization |
| 000000 | 11 01<u>1</u> | 10 11D | ≥2 | Out-Synchronization |
| 000000 | 11 0<u>0</u>0 | 10 00D | ≥2 | Out-Synchronization |
| 000000 | 11 <u>1</u>10 | 11 10D | ≥2 | Out-Synchronization |
| 000000 | 1<u>0</u> 010 | 10 DDD | ≥1 | Out-Synchronization |
| 000000 | <u>0</u>1 010 | 10 DDD | ≥1 | Out-Synchronization |
| 00000<u>1</u> | 11 010 | 11 010 | 0 | In-Synchronization |
| 0000<u>1</u>0 | 11 010 | 11 010 | 0 | In-Synchronization |
| 000<u>1</u>00 | 11 010 | 11 010 | 0 | In-Synchronization |
| 00<u>1</u>000 | 11 010 | 11 010 | 0 | In-Synchronization |
| 0<u>1</u>0000 | 11 010 | 11 010 | 0 | In-Synchronization |
| <u>1</u>00000 | 11 010 | 11 010 | 0 | In-Synchronization |

D=don't care

| AW | UW | (cont.) | (cont.) |
|---|---|---|---|
| 11 | 010 | 1101 | 01001 |
| 11 | 101 | 1101 | 01011 |
| 1100 | 010 | 1101 | 01100 |
| 1100 | 101 | 1101 | 01110 |
| 1110 | 010 | 1101 | 01111 |
| 1110 | 100 | 1101 | 10001 |
| 1111 | 010 | 1101 | 10010 |
| 1100 | 0010 | 1101 | 10011 |
| 1100 | 0100 | 1101 | 10100 |
| 1100 | 0101 | 1101 | 10101 |
| 1100 | 1000 | 1101 | 11001 |
| 1100 | 1010 | 1101 | 11010 |
| 1100 | 1011 | 1101 | 11101 |
| 1100 | 1101 | 1110 | 00010 |
| 1100 | 1110 | 1110 | 00100 |
| 1101 | 0010 | 1110 | 00101 |
| 1101 | 0100 | 1110 | 00110 |
| 1101 | 0111 | 1110 | 01000 |
| 1101 | 1001 | 1110 | 01001 |
| 1101 | 1010 | 1110 | 01010 |
| 1110 | 0010 | 1110 | 01011 |
| 1110 | 0100 | 1110 | 01100 |
| 1110 | 0101 | 1110 | 01101 |
| 1110 | 0110 | 1110 | 10000 |
| 1110 | 1000 | 1110 | 10001 |
| 1110 | 1001 | 1110 | 10010 |
| 1110 | 1011 | 1110 | 10011 |
| 1110 | 1100 | 1110 | 10100 |
| 1111 | 0010 | 1110 | 10110 |
| 1111 | 0100 | 1110 | 10111 |
| 1111 | 0101 | 1110 | 11000 |
| 1111 | 0110 | 1110 | 11001 |
| 1111 | 1010 | 1110 | 11010 |
| 1100 | 00010 | 1110 | 11100 |
| 1100 | 00100 | 1110 | 11110 |
| 1100 | 00101 | 1111 | 00010 |
| 1100 | 01000 | 1111 | 00100 |
| 1100 | 01001 | 1111 | 00101 |
| 1100 | 01010 | 1111 | 00110 |
| 1100 | 01011 | 1111 | 01000 |
| 1100 | 01101 | 1111 | 01001 |
| 1100 | 01110 | 1111 | 01010 |
| 1100 | 10000 | 1111 | 01011 |
| 1100 | 10001 | 1111 | 01100 |
| 1100 | 10011 | 1111 | 01101 |
| 1100 | 10100 | 1111 | 01110 |
| 1100 | 10101 | 1111 | 10010 |
| 1100 | 10110 | 1111 | 10100 |
| 1100 | 10111 | 1111 | 10101 |
| 1100 | 11000 | 1111 | 10110 |
| 1100 | 11010 | 1111 | 11010 |
| 1100 | 11011 | | |
| 1100 | 11100 | | |
| 1100 | 11101 | | |
| 1100 | 11110 | | |
| 1101 | 00010 | | |
| 1101 | 00100 | | |
| 1101 | 00101 | | |
| 1101 | 00111 | | |
| 1101 | 01000 | | |

FIG. 15

ATM CELL DETECTOR

BACKGROUND OF THE INVENTION

The invention relates to a method for detecting, from a bit stream, data packets such as ATM data cells, in particular where these originate from different sources and are combined into one stream of data packets, each data packet being preceded by a preamble which comprises at least a gap, formed by a number of 0-bits, and a unique word UW, whose reference value is formed by a specific combination of 0-bits and 1-bits and which has a length of b(uw) bits.

It is generally known to have data packets preceded by a string of 0-bits ("gap") and a recognition string, the unique word (UW). using windowing of the detected bit stream, the beginning of a new data packet is detected as soon as the bit string within the window corresponds to the specified UW which is known beforehand and stored in the system in which the data packets have to be detected. If this method is to have a sufficiently low error probability, the UW has to be fairly long, which results in the detection thereof being relatively processing-intensive and thus requiring a considerable amount of time.

SUMMARY OF THE INVENTION

The object of the present invention is to provide a more rapid method for detecting the beginning of data packets. It is characteristic of the invention that the UW is preceded by a bit alignment word AW whose reference value is formed by, beginning with a 1-bit, a specific combination of 0-bits and 1-bits and which has a length of b(aw) bits, the following steps being carried out successively for the purpose of detecting a new data packet after following a previous data packet has ended:

The technique of the present invention comprises detecting, from the bit stream, the first 1-bit to occur and calculating, for a first detected bit string B(d1), following which begins with that first detected 1-bit and has a length b(d1) equal to the number of bits b(aw) of the reference AW plus the number of bits b(uw) of the reference UW, the Hamming distance hd(1) between that first detected bit string B(d1) and a first reference bit string B(aw+uw) which is equal to the reference AW plus the reference UW;

calculating, for a second detected bit string B(d2), which begins with the detected bit, (b(aw)-1 ) bits after the said detected first 1-bit to occur, and has a length b(d2) equal to the number of bits b(uw) of the reference UW, the Hamming distance hd(2) between that detected bit string B(d2) and a second reference bit string B(uw) which is equal to the reference UW;

detecting, from the bit stream, the second 1-bit to occur and calculating, for a third detected bit string B(d3), which begins with that second detected 1-bit and has a length b(d3) equal to the number of bits b(aw) of the reference AW plus the number of bits b(uw) of the reference UW, the Hamming distance hd(3) between that third detected bit string B(d3) and the third reference bit string B(aw+uw) which is equal to the reference AW plus the reference UW;

calculating the position of the first bit of the new data packet on the basis of one or more of the calculated Hamming distances hd(1), hd(2) and hd(3) according to the following rules, where p is the number of bits of possible further preamble words which follow the said gap, the AW and the UW:

— if hd(1)=0 or hd(1)=1, then the first bit of the data packet is situated at a distance of b(aw+uw)+p bits after the detected first 1-bit;

— if hd(2)=0, then the first bit of the data packet is situated at a distance of b(aw+uw)-1 +p bits after the detected first 1-bit; and — if hdl(3)=0, then the first bit of the data packet is situated at a distance of b(aw+uw)+p bits after the detected second 1-bit.

A system for implementing the abovementioned method according to the invention comprises, in addition to a first and a second bit detector, a pointer unit and a number of computational units for calculating the various abovementioned Hamming distances, as well as a computational unit for calculating, on the basis of those Hamming distances (or status codes derived therefrom) the position of the first bit of the new data packet to be detected. The invention is expounded hereinafter with reference to a specific embodiment of a system according to the invention.

BRIEF DESCRIPTION OF THE DRAWINGS

FIGS 3, 4 and 5 show, for a first example and in tabular form, the results of the three abovementioned processing steps.

FIGS. 6, 7 and 8 show such results for a second example, FIGS. 9, 10 and 11 for a third example and FIGS. 12, 13 and 14 for a fourth example.

FIG. 15 shows an overview with preferred values for the AW and the UW.

DETAILED DESCRIPTION

Figure 1:
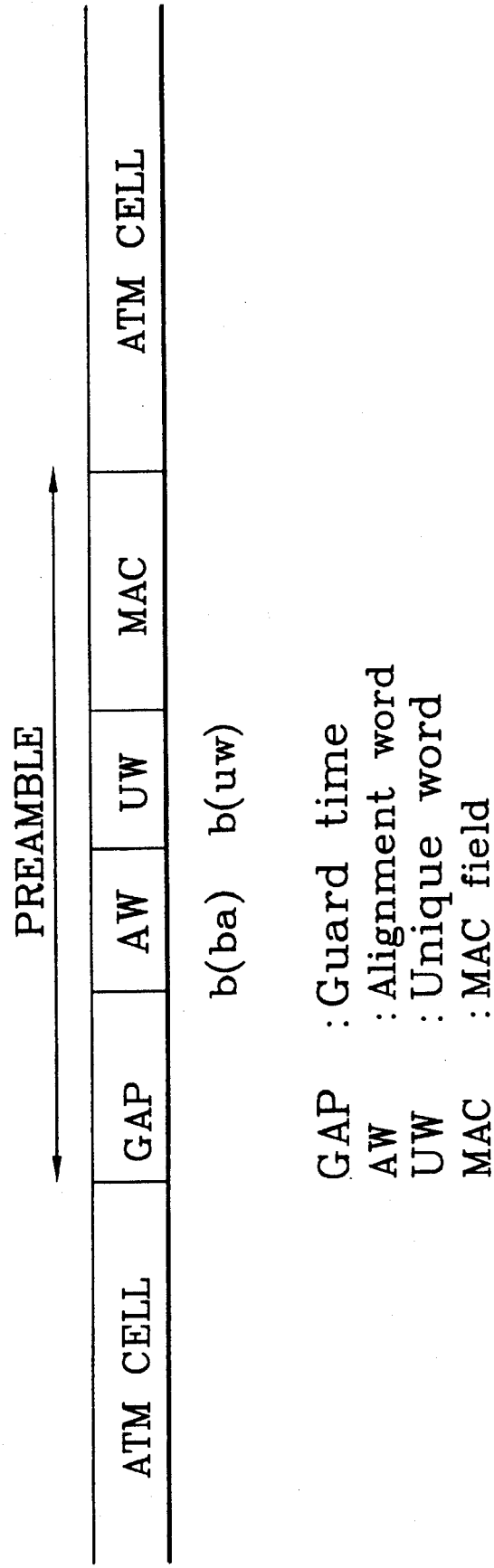
FIG. 1 shows a bit string with a first and a second ATM data cell, and also shows, the preamble of the second data cell - situated between the two data cells.
Figure 2:
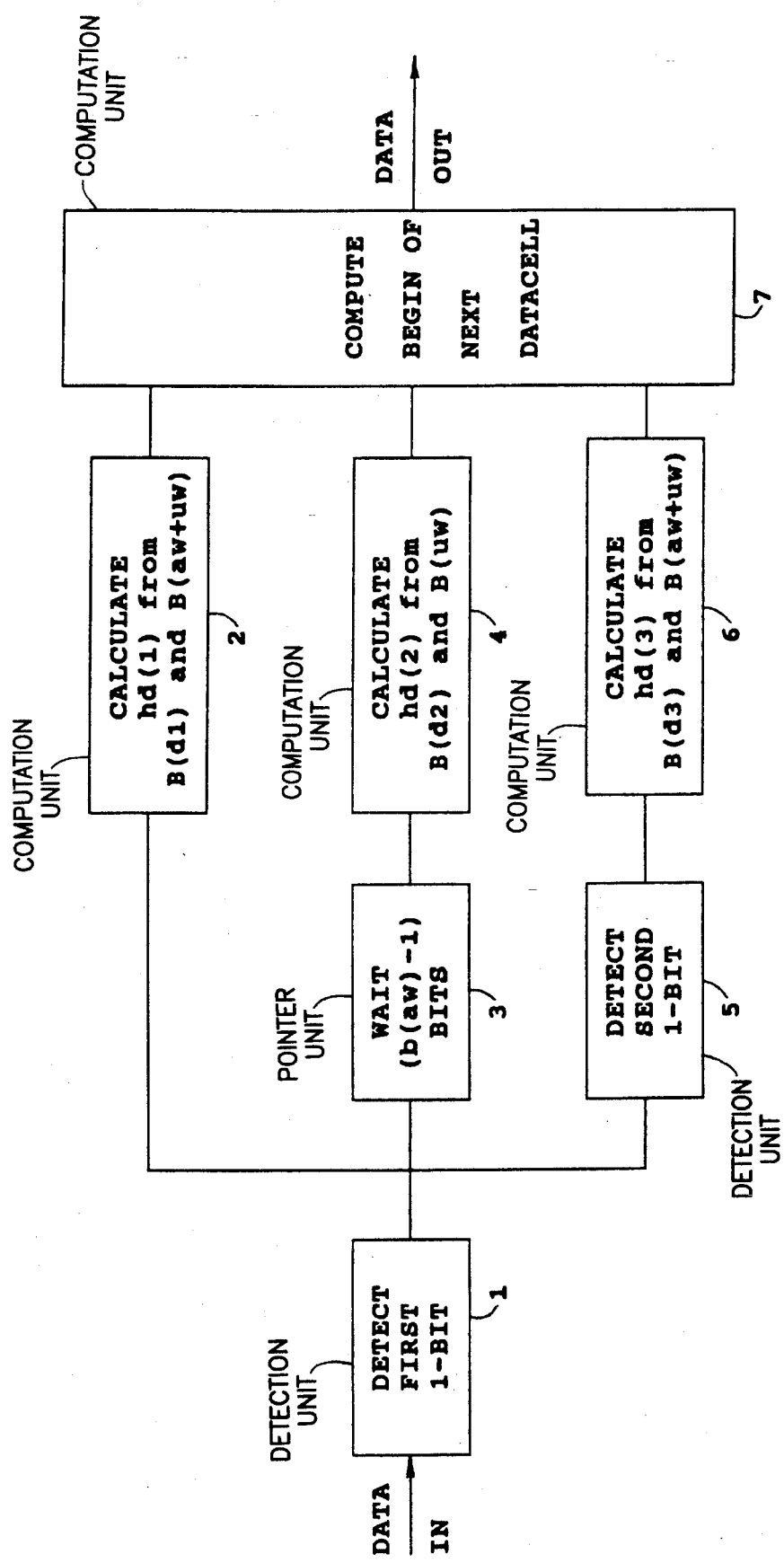
FIG. 2 shows in diagrammatic form a system according to the invention.

FIG. 1 shows first and second ATM data cells 10, 20 such as those which can be observed, for example, in a local network centre to which various subscribers are connected. The first data cell 10 (on the left in FIG. 1) originates, for example, from a first subscriber, and the second data cell 20 originates from a second subscriber. Owing to propagation time differences due to different distances from the subscribers to the network centre, the possibility that data cells originating from different sources (subscribers) follow one another with an unknown waiting time should be taken into account. For that reason, each data cell is preceded by a gap 12 with an unknown number of 0-bits. As the number of 0-bits is not known beforehand, the beginning of the following data cell has to be detected, to which end use is normally made of an identification string, the unique word UW, consisting of 1-bits and 0-bits. Together with possible further bit words, such as the MAC field shown (whose function will not be discussed here in further detail), the gap 12 and the unique word form the so-called preamble of the ATM data cell. The identification of a new data cell with the aid of a unique word only (by means of, for example, a "jumping window" or a "moving window" having the same bit length as the unique word, the contents of the window being compared with the reference value of the unique word) is rather laborious in practice. The method according to the invention offers a better alternative in this respect. According to the invention, the preamble which precedes the unique word UW comprises a bit alignment word (of, for example, from 2 to 4 bits). The data cell detection process is carried out in accordance with the abovementioned processing steps. These steps are carried out by a system which is depicted diagrammatically in FIG. 2.

First processing step

The first 1-bit of the bit stream to be examined is detected in detection unit 1. The bit string B(dl) following thereafter and having a length which is equal to the bit length of the alignment word AW, b(aw), and the unique word UW, b(uw), is compared, by a processor 2, with a reference string stored in that processor, equal to the AW plus the UW, and the processor 2 calculates the Hamming distance hd(1) between those two. If hd(1)=0 or=1 (i.e. in no position or only in one position was a difference in the bit value detected), a status code "in-synchronization" (IS) is output to a decision processor 7. If hd(1) is greater than 1, a status code "out-synchronization" (OS) is output. All this is illustrated in FIG. 3. In FIG. 3, as in FIGS. 4–15, differences in bit value (bit errors) are underlined. The first line in FIG. 3 shows a detected bit stream (after the end of a previous data packet - consisting of a gap of 8 0-bits, an AW "1100" and a UW "10101". In this case, as can be seen, both the detected gap and the detected AW and UW are correct (the detected value of AW and UW is equal to the reference value of AW and UW). In processor 2, a first bit string B(dl ) is determined which is formed by the x bits following the first 1-bit detected by detector 1 (in this case the first 1-bit of the AW), where x is equal to the length of the reference AW plus the length of the reference UW, in other words x=b(aw)+b(uw); this bit string is shown in the fourth column. The bit string B(dl) is then compared, in processor 2, with a bit string B(aw+uw) which is formed by the reference AW plus the reference UW, and the number of mutual bit errors, the Hamming distance, between those two bit strings B(dl) and B(aw+uw) is determined. Since, in the situation of line 1 of FIG. 3, there are no bit differences between B(dl) (="110010101")and B(aw+uw) (="10101"), the Hamming distance is hd(1)=0; processor 2 outputs a code "in-synchronization". The system is now able to calculate the first bit of the MAC field (see FIG. 1) or, given the fixed length of that/MAC field (and possible further preamble fields), of the data cell as such and can read out the contents of that data cell. In lines 2 to 9 inclusive of FIG. 3, situations are illustrated where one of the bits of the detected AW or UW deviates from the reference AW and the reference UW. In each of the cases shown, however, the first 1-bit of the AW is correct, as a result of which the bit string B(dl) is in fact the same bit string as in the example of line 1, a bit error, however, existing at one position in that bit string B(dl). Owing to that one bit error, in all those cases of lines 2 to 9 inclusive, the Hamming distance, compared with B(aw+uw) (="1100"+"10101"), is hd(1)=1, resulting in an "in-synchronization" status code. In these cases, the data cell will begin at the same position as in the case (line 1 ) where zero errors had occurred (hd(1)=0) in the detected AW and UW, namely x bits further along than the first detected 1-bit plus the number of bits which, after the AW and the UW, still forms part of the preamble (such as the MAC field shown in FIG. 1). The situation changes in the case of line 10 and the following. In the case of line 10, the first 1-bit of the detected AW has become a 0-bit, for example owing to a transmission error. As a result, the first detected 1-bit has a different position, namely the next 1-bit in the detected AW at the second bit position thereof. Consequently, bit string B(dl) attains a value which deviates completely from the reference bit string B(aw+uw): a Hamming distance hd(1) of at least 6 and therefore an "out-synchronization" status code is the result. Given this status code, it is not possible to establish the beginning of the data cell; to this end, a pointer unit 3 and a processor unit 4 are provided, whose mode of operation is illustrated in FIG. 4. In the lines 11 and following, one of the 0-bits of the GAP has been changed into a 1-bit which likewise results in an hd(1) of greater than 1 and an "out-synchronization" status code. It should be noted that the designations "in-synchronization" and "out-synchronization" do not per se have any greater significance for the present system than the two possible values of an (auxiliary) status code on the basis of which, in the decision processor 7, the beginning of the data cell is calculated; hereinafter, those values will be designated, in abbreviated form, by "IS" and "OS", respectively.

Second processing step

Line 10 of FIG. 3 (and of FIGS 4 and 5) represents the situation where the first bit of the detected AW has changed to a 0-bit. Since it is not the number of GAP bits which is used as a detection means for detecting the AW - said number of GAP bits is not reliable because of, as stated above, the propagation time differences of the various data cells - but instead, the first 1-bit, the change of the 1-bit into a 0-bit in processor 2 has the result that the beginning of the data cell cannot be calculated. The pointer units 3 and the processor unit 4, however, eliminate this problem in the following manner (see FIG. 4). The pointer unit 3 determines the beginning of a second bit string B(d2) from the bit stream. That bit string B(d2) begins with the y-th bit after the first detected 1-bit (detected by detector 1), y being equal to the length in bits of the reference AW, decremented by 1: y=b(aw)-1. In the present example, the reference value of AW is "1100", and the value for y is thus (4–1)=3. As FIG. 4, line 10 shows, the bit string B(d2) to be examined therefore begins with the third bit after the first detected 1-bit (owing to the error which has occurred, in this case, therefore, the second bit of the AW). B(d2) has a length which is equal to the number of bits making up the reference UW, thus in this case 5 bits. B(d2) is then compared with a bit string B(uw) which is equal to the UW, and from this the Hamming distance hd(2) is calculated. The result is a status code IS if hd(2)=0, and in all other cases a status code OS. It can be seen in the table that for all other (single) bit errors in the bit stream hd(2)>0.

Third processing step

As can be seen from the above, bit errors in the gap (as depicted in lines 11 to 18 inclusive) (in FIG. 3–5 inclusive) have such an effect on the Hamming distance calculated by the units 2 and 4 and on the output status codes that the beginning of the data cell cannot be calculated. The elimination of this effect is achieved by a processor 6, together with a detection unit 5, whose mode of operation is illustrated in FIG. 5. In detection unit 5, the first 1-bit is detected which follows the first 1-bit detected in detection unit 1; the 1-bit detected in detection unit 5 is therefore the second 1-bit in the bit string (GAP)+(AW)+(UW) to be examined. Starting from that second 1-bit, a third bit string B(d3) having a length x=b(aw)+b(uw) is defined which, as in the first processing step, is compared with a reference string B(aw+uw) which consists of the reference AW plus the reference UW. In FIG. 5, the result is shown: the first 10 lines (single bit errors in the (AW) and (UW) portion of the detected bit stream) give a large Hamming distance (hd(3)) and an OS status code; the lines 11 to 18 inclusive, however, in this case give a Hamming distance of 0, and IS as the status code. The beginning of the data cell x is situated x bits further along than the second 1-bit detected by detection unit 5 plus the number of bits of the MAC field (and possible further preamble fields).

In FIGS. 6 to 14 inclusive, the three processing steps are carried out in the same way as those discussed above, but with different reference values for the AW and the UW:

| FIGS. | Ref. AW | Ref. UW | Proc. step | Units |
|---|---|---|---|---|
| 3 | 1100 | 10101 | 1 | 1–2 |
| 4 | 1100 | 10101 | 2 | 3–4 |
| 5 | 1100 | 10101 | 3 | 5–6 |
| 6 | 1100 | 0101 | 1 | 1–2 |
| 7 | 1100 | 0101 | 2 | 3–4 |
| 8 | 1100 | 0101 | 3 | 5–6 |
| 9 | 1100 | 010 | 1 | 1–2 |
| 10 | 1100 | 010 | 2 | 3–4 |
| 11 | 1100 | 010 | 3 | 5–6 |
| 12 | 11 | 010 | 1 | 1–2 |
| 13 | 11 | 010 | 2 | 3–4 |
| 14 | 11 | 010 | 3 | 5–6 |

The decision processor 7 calculates, on the basis of the status codes resulting from the processing steps 1, 2 and 3 (or directly from the values for hd(1), hd(2) and hd(3)) the beginning of the data cell as was stated above, namely —if hd(1)=0 or hd(1)=1 (status code IS), then the first bit of the data packet is situated at a distance of b(aw+uw)+p bits after the detected first 1-bit;

—if hd(2)=0 (status code IS), then the first bit of the data packet is situated at a distance of b(aw+uw)-1+p bits after the detected first 1-bit;

—if hd(3)=0 (status code IS), then the first bit of the data packet is situated at a distance of b(aw+uw)+p bits after the detected second 1-bit; and transmits that calculated position to the rest of the system, so that the contents of the data cell (and of the rest of the preamble, of which the number of bits is represented by p) can be read out.

Finally, FIG. 15 shows a number of AW and UW reference values which - as simulations show - are eminently suitable for the present object.

I claim:

1. Method for detecting, from a bit stream, the beginning of data packets such as ATM data cells, which data packets originate from different sources and are combined into one stream of data packets, each data packet being preceded by a preamble which comprises at least a gap, formed by a number of 0-bits, and a unique word UW having a unique word reference value which is formed by a specific combination of 0-bits and 1-bits and which unique word reference value has a length of b(uw) bits, wherein the unique word UW is preceded by a bit alignment word AW having an alignment word reference value which is formed by, beginning with a 1-bit, a specific combination of 0-bits and 1-bits and which has a length of b(aw) bits, the method comprising the following steps being carried out successively for the purpose of detecting a new data packet after a previous data packet has ended:

detecting, from a bit stream, the first 1-bit to occur and calculating, for a first detected bit string B(dl), which begins with the first detected 1-bit and which has a length b(dl) equal to the number of bits b(aw) of the alignment word reference value plus the number of bits b(uw) of the unique word reference value, a Hamming distance hd(1) between the first detected bit string B(dl) and a first reference bit string B(aw+uw) being equal to the alignment word reference value plus the unique word reference value;

calculating, for a second detected bit string B(d2), which begins with the detected first 1-bit, (b(aw)-1) bits after said detected first 1-bit occurs and which has a length b(d2) equal to the number of bits b(uw) of the unique word reference value, the Hamming distance hd(2) between the second detected bit string B(d2) and a second reference bit string B(uw) which is equal to the unique word reference value;

detecting, from the bit stream, a second 1-bit to occur and calculating, for a third detected bit string B(d3), which begins with the second detected 1-bit and which has a length b(d3) equal to the number of bits b(aw) of the alignment word reference value plus the number of bits b(uw) of the unique word reference value, the Hamming distance hd(3) between the third detected bit string B(d3) and the third reference bit string B(aw+uw) which is equal to the alignment word reference value plus the unique word reference value;

calculating the position of the first bit of a new data packet on the basis of at least one of the calculated Hamming distances hd(1), hd(2) and hd(3) according to the following rules, where p is the number of bits of possible further preamble words which follow the gap, the alignment word AW and the unique word UW:

if hd(1)=0 or hd(1)=1, then the first bit of the data packet is situated at a distance of b(aw+uw)+p bits after the detected first 1 -bit;

if hd(2)=0, then the first bit of the data packet is situated at a distance of b(aw+uw)-1+p bits after the detected first 1-bit; and if hd(3)=0, then the first bit of the data packet is situated at a distance of b(aw+uw)+p bits after the detected second 1-bit.

2. System for detecting, from a bit stream, the beginning of data packets such as ATM data cells, each data packet being preceded by a preamble which comprises at least a gap, formed by a number of 0-bits, and a unique word UW having a unique word reference value which is formed by a specific combination of 0-bits and 1-bits and which unique word reference value has a length of b(uw) bits, wherein the unique word UW is preceded by a bit alignment word AW having an alignment word reference value which is formed by, beginning with a 1-bit, a specific combination of 0-bits and 1-bits and which has a length of b(aw) bits, the system detecting a subsequent data packet after a first data packet has ended, the system comprising:

a first detection unit (1) for detecting, from the bit stream, the first 1-bit after said first data packet has ended;

a first processingq unit (2) for calculating, for a first detected bit string B(dl), which begins with the first 1-bit detected by the first detection unit (1) and which has a length b(dl) equal to the number of bits b(aw) of the alignment word reference value plus the number of bits b(uw) of the unique word reference value, the Hamming distance hd(1) between the first detected bit string B(dl) and a first reference bit string B(aw+uw) being equal to the alignment word reference value plus the unique word reference value;

a pointer unit (3) for indicating the (b(aw)-1)th bit after the first detected 1-bit;

a second processing unit (4) for calculating, for a second detected bit string B(d2), which begins with the bit indicated by the pointer unit (3), (b(aw)-1) bits after the first 1-bit detected by the first detection unit (1), and which has a length b(d2) equal to the number of bits b(uw) of the unique word reference value, the Hamming distance hd(2) between the second detected bit string B(d2) and a second reference bit string B(uw) being equal to the unique word reference value;

a second detection unit (5) for detecting the second 1-bit in the bit stream, after said first data packet has ended;

a third processing unit (6) for calculating, for a third detected bit string B(d3) which begins with the second 1-bit detected by the second detection unit (5) and which has a length b(d3) equal to the number of bits b(aw) of the alignment word reference value plus the number of bits b(uw) of the unique word reference value, the 0-bits and 1-bits and which has a length of b(aw) bits, Hamming distance hd(3) between the third detected bit string B(d3) and the third reference bit string B(aw+uw) being equal to the alignment word reference value plus the unique word reference value;

a fourth processing unit (7) for calculating the position of the first bit of the following data packet on the basis of at least one of the calculated Hamming distances hd(1), hd(2) and hd(3) calculated by at least one of said processing units according to the following rules, where p is the number of bits of possible further preamble words which follow said gap, the alignment word AW and the unique word UW:

if hd(1)=0 or hd(1)=1, then the first bit of the data packet is situated at a distance of b(aw+uw)+p bits after the detected first 1-bit;

if hd(2)=0, then the first bit of the data packet is situated at a distance of b(aw+uw)-1+p bits after the detected first 1-bit; and if hd(3)=0, then the first bit of the data packet is situated at a distance of b(aw+uw)+p bits after the detected second 1-bit.

* * * * *

UNITED STATES PATENT AND TRADEMARK OFFICE
CERTIFICATE OF CORRECTION

PATENT NO.   : 5,485,461
DATED        : January 16, 1996
INVENTOR(S)  : ASGARI

It is certified that error appears in the above-indentified patent and that said Letters Patent is hereby corrected as shown below:

Column 1, line 16, change "using" to --Using--.

Column 3, line 36, change (="10101") to --(="1100"+"10101").

Column 4, line 23, change "units" to --unit--.

Column 7, lines 9 and 10 (claim 2), delete "0-bits and 1-bits and which has a length of b(aw) bits,".

Signed and Sealed this

Seventeenth Day of June, 1997

Attest:

*Attesting Officer*

BRUCE LEHMAN

*Commissioner of Patents and Trademarks*